US012583075B2

(12) United States Patent
Cheng et al.

(10) Patent No.: US 12,583,075 B2
(45) Date of Patent: Mar. 24, 2026

(54) GRINDING MACHINE TOOL FOR REDUCING HOTNESS OF CASING

(71) Applicant: X'POLE PRECISION TOOLS INC., Taoyuan City (TW)

(72) Inventors: Ding-Yao Cheng, Taoyuan City (TW); Chih-Chung Lin, Taoyuan City (TW); Yu-Fan Wen, Taoyuan City (TW); Wen-Hsien Su, Taoyuan City (TW)

(73) Assignee: X'POLE PRECISION TOOLS INC., Taoyuan City (TW)

( * ) Notice: Subject to any disclaimer, the term of this patent is extended or adjusted under 35 U.S.C. 154(b) by 430 days.

(21) Appl. No.: 17/205,851

(22) Filed: Mar. 18, 2021

(65) Prior Publication Data

US 2022/0297254 A1 Sep. 22, 2022

(51) Int. Cl.
*B24B 23/02* (2006.01)
*B24B 23/00* (2006.01)
(Continued)

(52) U.S. Cl.
CPC ............ *B24B 23/02* (2013.01); *B24B 23/005* (2013.01); *B24B 55/02* (2013.01); *B25F 5/008* (2013.01); *B25F 5/021* (2013.01)

(58) Field of Classification Search
CPC ....... B24B 7/186; B24B 23/02; B24B 23/028; B24B 55/02; B24B 55/03; B24B 55/04;
(Continued)

(56) References Cited

U.S. PATENT DOCUMENTS 7,270,598 B2 9/2007 Dutterer et al.
8,226,454 B2 * 7/2012 Chen ....................... B24B 23/04 451/449
(Continued)

FOREIGN PATENT DOCUMENTS

CN 107030608 A 8/2017
CN 109420963 A * 3/2019 ............ B24B 23/02
(Continued)

OTHER PUBLICATIONS

English Translation of CN 109420963 A (Year: 2019).*
English Translation of WO 2021065273 A1 (Year: 2021).*

*Primary Examiner* — Brian D Keller
*Assistant Examiner* — Marcel T Dion
(74) *Attorney, Agent, or Firm* — MUNCY, GEISSLER, OLDS & LOWE, P.C.

(57) ABSTRACT

A grinding machine tool for reducing hotness of a casing, includes a casing and a drive assembly. The casing is divided into a head and a body; includes casing parts; includes an air inlet provided on the body and an air outlet provided on a side of the head; and forms a motor cover on the head, and the motor cover does not contact the casing parts to form an airflow passage in the casing. The drive assembly includes a circuit board, a motor placed into the motor cover, and an airflow generating member rotating synchronously with the motor. When the airflow generating member rotates, it generates a first heat dissipation airflow passing through the airflow passage and dissipating heat of the circuit board and the head, and a second heat dissipation airflow dissipating heat on a side of the motor facing the airflow generating member.

13 Claims, 10 Drawing Sheets

(51) Int. Cl.
*B24B 55/02* (2006.01)
*B25F 5/00* (2006.01)
*B25F 5/02* (2006.01)

(58) Field of Classification Search
CPC ..... B24B 55/045; B24B 55/05; B24B 55/052; B24B 55/10; B24B 55/102; B25F 5/008; B25F 5/021
USPC .................................. 451/344, 359, 449, 456
See application file for complete search history.

(56) References Cited

U.S. PATENT DOCUMENTS

| | | | | |
|---|---|---|---|---|
| 9,408,513 | B2 | 8/2016 | Elen | |
| 9,505,119 | B2 * | 11/2016 | Chen | B24B 23/06 451/344 |
| 2004/0263008 | A1 * | 12/2004 | Voigt | H02K 9/06 310/58 |
| 2011/0136419 | A1 | 6/2011 | Chen | |
| 2011/0148227 | A1 * | 6/2011 | Schuele | B25F 5/008 310/50 |
| 2011/0183586 | A1 * | 7/2011 | Lehman | B24B 23/03 451/442 |
| 2016/0229045 | A1 * | 8/2016 | Hashimoto | B25D 17/043 173/2 |
| 2022/0152767 | A1 * | 5/2022 | Huber | B25F 5/02 173/198 |
| 2022/0184793 | A1 * | 6/2022 | Aoki | B25F 5/008 310/50 |

FOREIGN PATENT DOCUMENTS

| | | | | |
|---|---|---|---|---|
| CN | 110270930 | A | 9/2019 | |
| DE | 102007000290 | A1 | 11/2008 | |
| WO | WO-2017154523 | A1 * | 9/2017 | B24B 23/02 |
| WO | WO2019096223 | A1 | 5/2019 | |
| WO | WO2019130981 | A1 | 7/2019 | |
| WO | WO-2021065273 | A1 * | 4/2021 | B25F 5/008 |
| WO | WO-2022129685 | A1 * | 6/2022 | B24B 23/02 |

* cited by examiner

GRINDING MACHINE TOOL FOR REDUCING HOTNESS OF CASING

FIELD OF THE INVENTION

The invention relates to a grinding machine tool for reducing hotness of a casing, and more particularly to a grinding machine tool for reducing hotness of a casing by allowing heat dissipation airflows to circulate in the casing.

BACKGROUND OF THE INVENTION

It is found that the motor of a grinding machine tool is prone to generate thermal energy after being used for a long time. Although the existing grinding machine tools are equipped with a fan on a side of the motor, and the fan rotates with an output shaft and outputs a wind current toward the motor; however, the wind current can only flow toward the side of the motor facing the fan, resulting in the heat on the side of the conventional motor that does not face the fan cannot be dissipated, which causes uneven heat dissipation of the motor and the thermal energy on the motor will continue to accumulate and transfer to the motor casing.

Further, the existing motors are mostly arranged at a position at which the user holds the grinding machine tool. In order to reduce dust flowing into the machine tool, the conventional grinding machine tools employ a machine tool casing to seal off the inside of the machine body, resulting in the gas inside the machine tool being incapable of flowing. After the motor has been used for a long time, a large amount of thermal energy is prone to accumulate on the side of the motor that does not face the fan, and is transferred to the casing of the grinding machine tool through thermal radiation, which causes the casing of the grinding machine tool to heat up and thus is unfavorable for the user to hold.

In order to solve the aforementioned problem that it is not easy to dissipate heat inside the grinding machine tool, U.S. Pat. No. 7,270,598 discloses a conventional grinding machine tool technology that introduces external air into the inside of a grinding machine tool to dissipate heat. Specifically, the conventional grinding machine tool uses a dust suction tube to suck the dust-containing gas generated during grinding in order to change the gas pressure inside the machine tool, so that external air can enter into the machine tool and then enter into the dust suction tube through an air inlet. The external air passes through the motor while flowing toward the dust suction tube and dissipates heat from the motor. However, since the conventional heat dissipation mechanism is such that the flow direction of the external air after flowing into the machine tool is different from the flow direction of the dust-containing airflow, the external air and the dust-containing airflow easily interfere with each other and cause turbulence. Furthermore, when the conventional dust suction tube extracts dust, the dust suction airflow has to enter into the dust suction tube through the space inside the machine tool, resulting in the grinding machine tool being incapable of blocking the dust in the dust suction airflow from flowing into the grinding machine tool, and therefore the dust is prone to accumulate on the conventional motor and other electronic components to affect the operation of the components.

In addition, in order to solve the aforementioned problems, patents such as CN 110270930A and U.S. Pat. No. 9,408,513B no longer use the conventional heat dissipation mechanism for heat dissipation, that is, the grinding machine tools disclosed in patents CN 110270930A and U.S. Pat. No. 9,408,513B are not equipped with an air inlet through which external air enters, instead employ the casings of the grinding machine tools to seal off the inside of the machine tools in order to reduce dust accumulation. Further, the motors and the grinding machine tool casings in patents CN 110270930A and U.S. Pat. No. 9,408,513B are arranged spacedly apart from each other, thereby reducing the thermal energy accumulated by the motors from being transferred to the grinding machine tool casings. However, the grinding machine tools of CN 110270930A and U.S. Pat. No. 9,408,513B can still only dissipate heat locally on the motors, the motors still have the problem of uneven heat dissipation, and the heat dissipation solution of the motors not touching the casings of the grinding machine tools can only reduce the speed at which heat on the motors is transferred to the casings, but cannot specifically solve the problems of thermal energy accumulation on the motors and transfer of heat from the motors to the casings. Furthermore, since the conventional fan cannot introduce external air into the machine tool, the fan can only drive the gas inside the machine tool to form a wind current. After the conventional grinding machine tool has been used for a long time, heat accumulated on the motor and circuit board inside the grinding machine tool will cause the temperature of the gas inside the machine tool to rise, and the wind current generated by the fan will also heat up and cannot provide effective heat dissipation for the motor, resulting in the machine tool casing will still receive thermal energy from the motor and become hot. In addition, since the conventional grinding machine tool has a closed structure, and external air cannot flow into the machine tool to cool down the air inside the machine tool, the casing of the grinding machine tool may be affected by the internal air and heat up, which is unfavorable for the user to hold.

SUMMARY OF THE INVENTION

A main object of the invention is to solve the problem that the conventional heat dissipation mechanism that draws external air is prone to cause dust to enter into a grinding machine tool.

Another object of the invention is to solve the problem that the conventional grinding machine tool with a closed casing being incapable of specifically reducing hotness of the machine tool casing.

In order to achieve the above objects, the invention provides a grinding machine tool for reducing hotness of a casing, which includes a casing and a drive assembly. The casing is divided into a head and a body, the casing is composed of at least two casing parts, the casing includes an air inlet formed on the body and an air outlet formed on a side of the head opposite to the body, the casing is provided with a motor cover on the head, one end of the motor cover facing a grinding member is open, and there is a gap between the motor cover and the at least two casing parts, so that inside the casing is formed with an airflow passage that enters from the air inlet and discharges from the air outlet. The drive assembly includes a circuit board provided inside the casing, a motor placed into the motor cover and connected to the circuit board to drive the grinding member to rotate, and an airflow generating member shielding a side of the motor cover facing the grinding member and rotating synchronously with the motor. When the airflow generating member rotates, inside the casing the airflow generating member generates a first heat dissipation airflow that passes through the airflow passage and dissipates heat of the circuit board and the head of the casing, and a second heat dissipation airflow that dissipates heat on a side of the motor facing the airflow generating member.

In one embodiment, the grinding machine tool includes an air guiding member provided in the casing and located in the airflow passage, and the air guiding member includes a wind receiving end and an air output end higher than the wind receiving end.

In one embodiment, the motor cover is cylindrical, and the air guiding member forms a main guide surface along an edge of the motor cover, and two auxiliary guide surfaces respectively provided at two sides of the main guide surface and with a diversion direction different from that of the main guide surface.

In one embodiment, two sides of the air guiding member respectively extend on sides of the motor cover and form a guide passage in a gap between an inner wall of the head, and an inlet of the guide passage is higher than an outlet of the guide passage.

In one embodiment, the air guiding member is located at a junction of the body and the head.

In one embodiment, the motor includes an output shaft and a base assembled with the grinding member and driven by the output shaft, the airflow generating member includes a mounting seat assembled with the base, an end plate extending from the mounting seat, and a plurality of fan blades provided on a side of the end plate facing the motor cover.

In one embodiment, the plurality of fan blades stand on the end plate.

In one embodiment, the base includes two blocks provided in staggered positions, and the mounting seat includes an accommodating space formed to match the two blocks.

In one embodiment, the mounting seat is provided with at least two restraining arms for restraining the base from detaching.

In one embodiment, the accommodating space penetrates through two ends of the mounting seat, the mounting seat is provided with a limiting wall at an end of the accommodating space away from the plurality of fan blades, and the limiting wall and the two restraining arms jointly restrain the base.

In one embodiment, the grinding machine tool includes an end cover provided at an open end of the motor cover.

In one embodiment, the at least two casing parts are divided into a lower casing and an upper casing, the lower casing is assembled with the motor cover, and the upper casing does not contact the motor cover and jointly forms the airflow passage with the lower casing.

In one embodiment, the grinding machine tool includes a dust cover assembled with the casing and located on the head, and a dust collecting tube provided on the dust cover.

In one embodiment, the circuit board is provided on the body, the grinding machine tool includes a heat sink provided on the body and capable of dissipating heat from the circuit board, the lower casing includes a positioning groove for placing the heat sink therein, and the air inlet is formed in the positioning groove.

In one embodiment, the air inlet is composed of a plurality of strip holes.

According to the disclosure of foregoing invention content, compared with the conventional technology, the present invention includes the following features: in addition to the conventional heat dissipation mechanism to dissipate heat on one side of the motor, after the casing is assembled, the present invention makes the motor cover not to contact with the at least two casing parts to form the airflow passage in the casing, so that when the airflow generating member rotates, the first heat dissipation airflow is capable of flowing through the airflow passage to dissipate heat of the circuit board and the head of the casing.

DETAILED DESCRIPTION OF THE PREFERRED EMBODIMENTS

Figure 1:
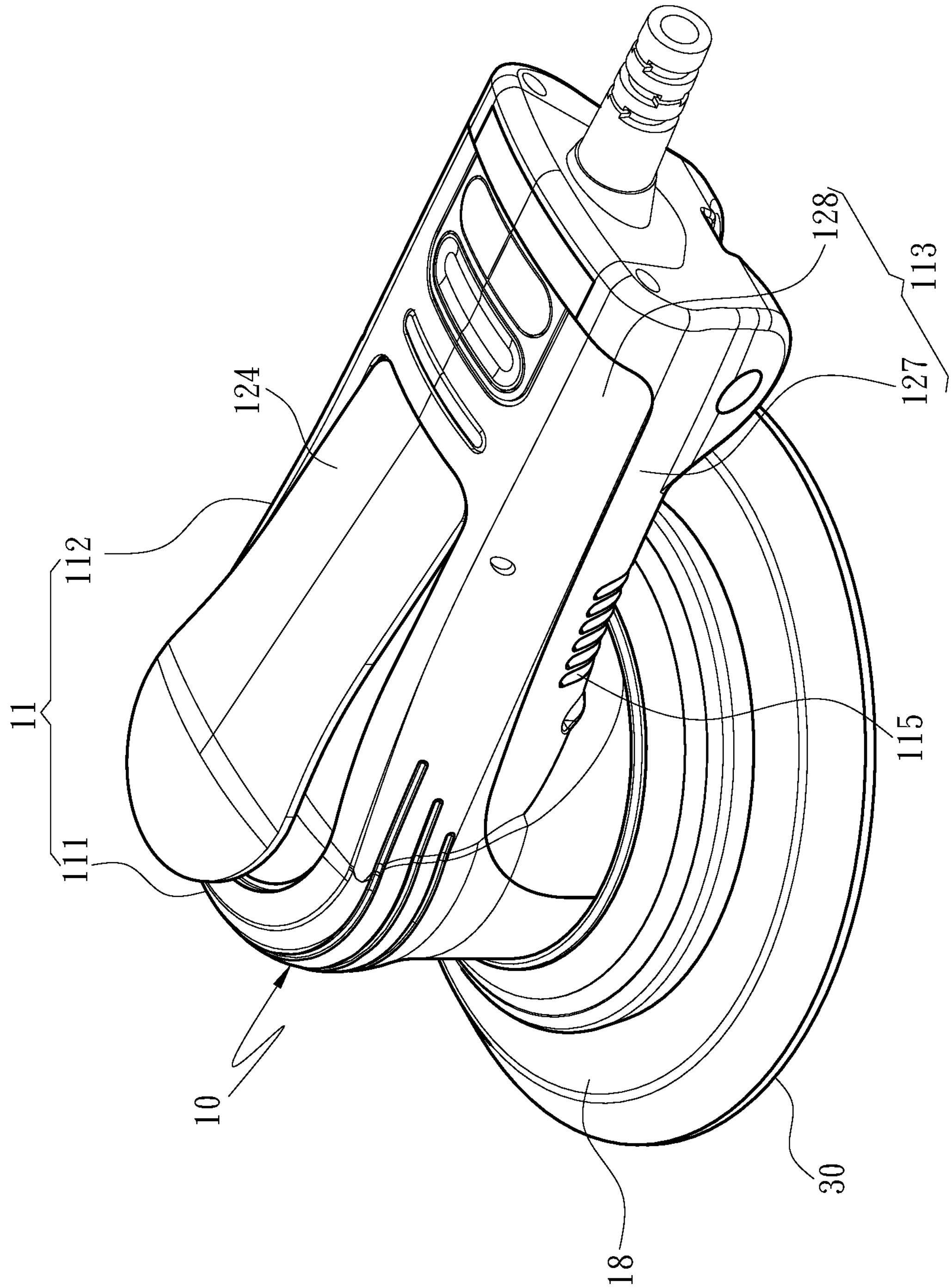
FIG. 1 is a perspective view of a first embodiment of the invention.
Figure 2:
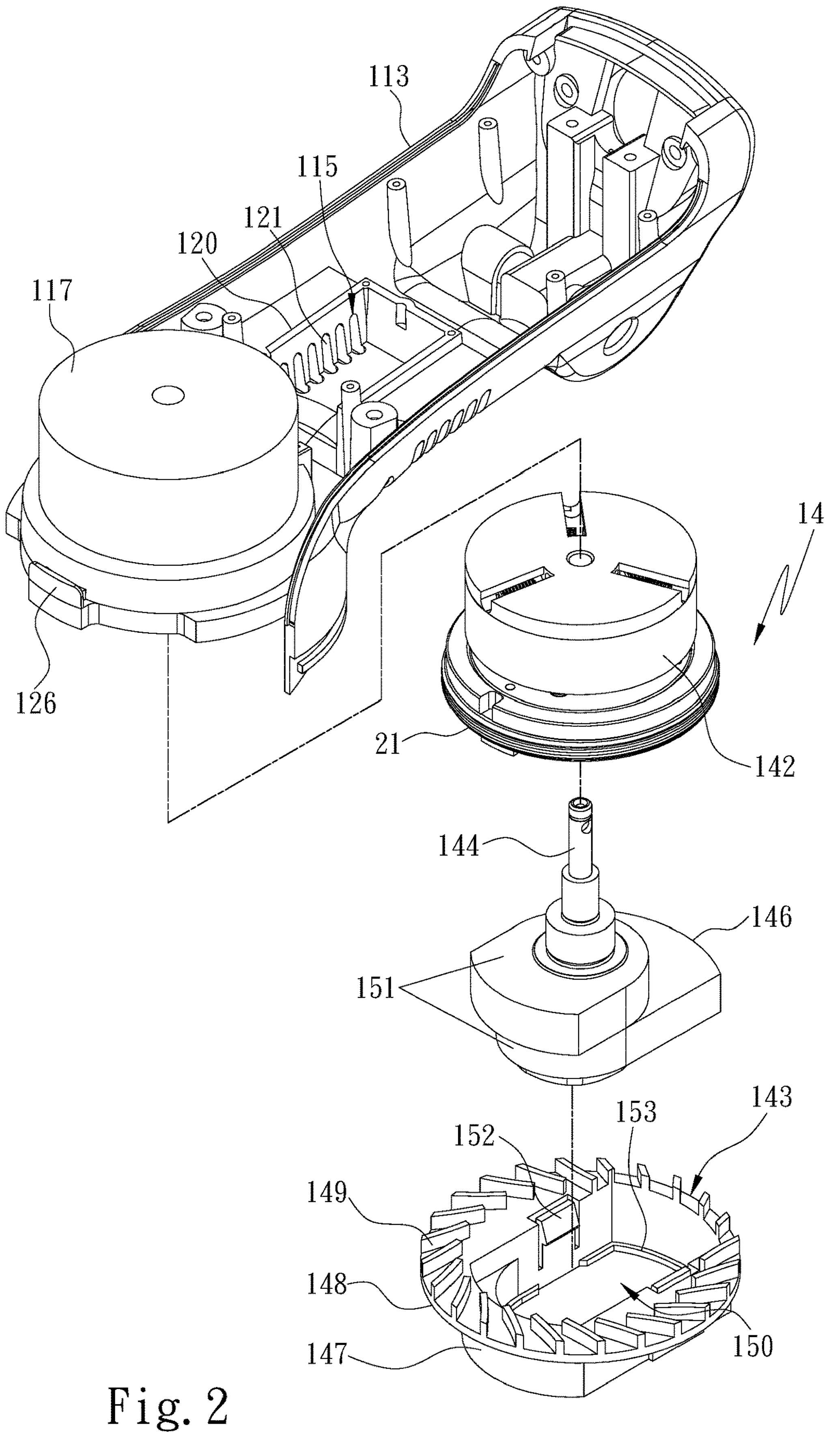
FIG. 2 is an exploded perspective view of partial structures of the first embodiment of the invention.
Figure 3:
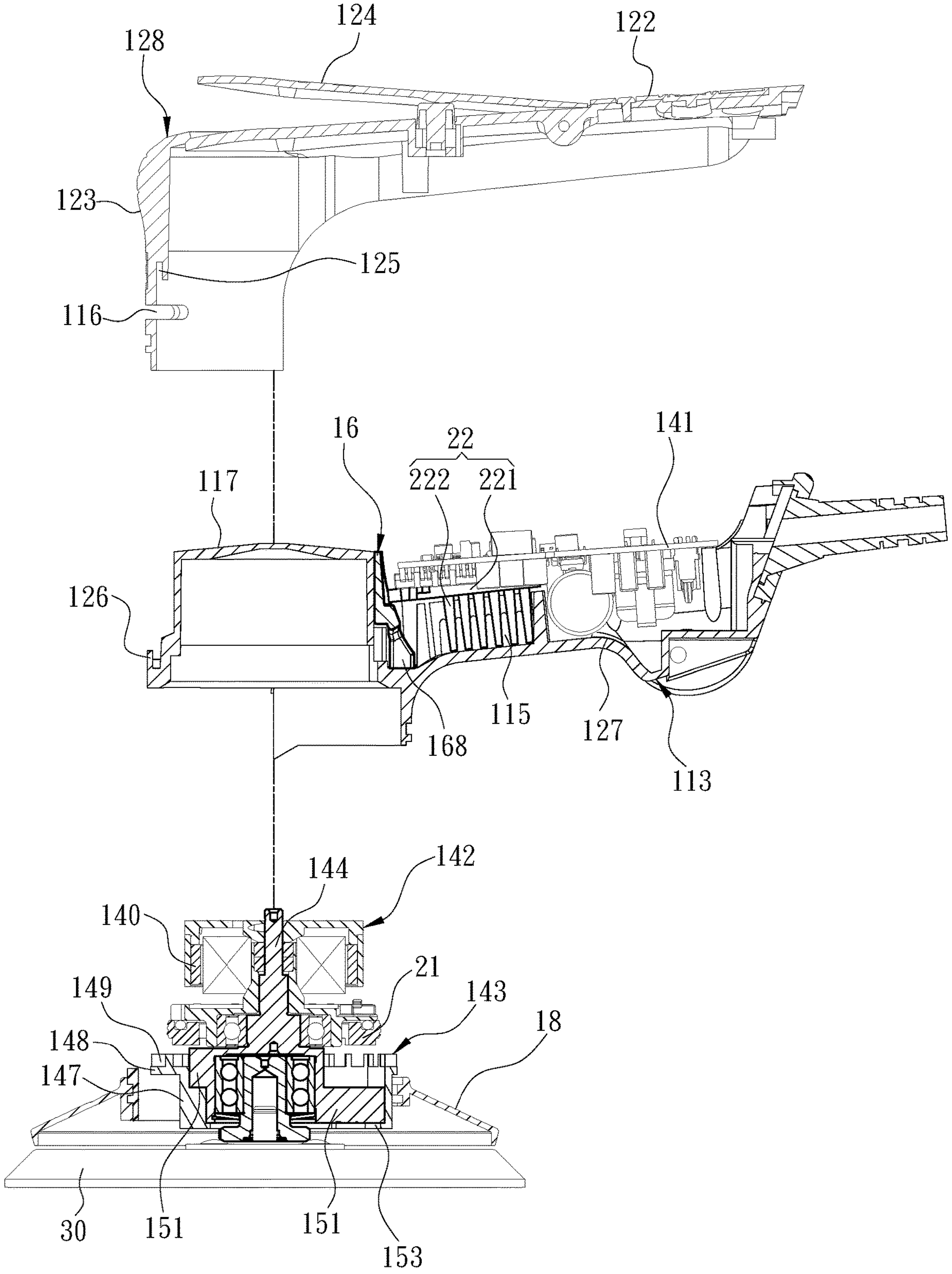
FIG. 3 is exploded schematic diagrams of cross-sectional structures of the first embodiment of the invention.
Figure 4:
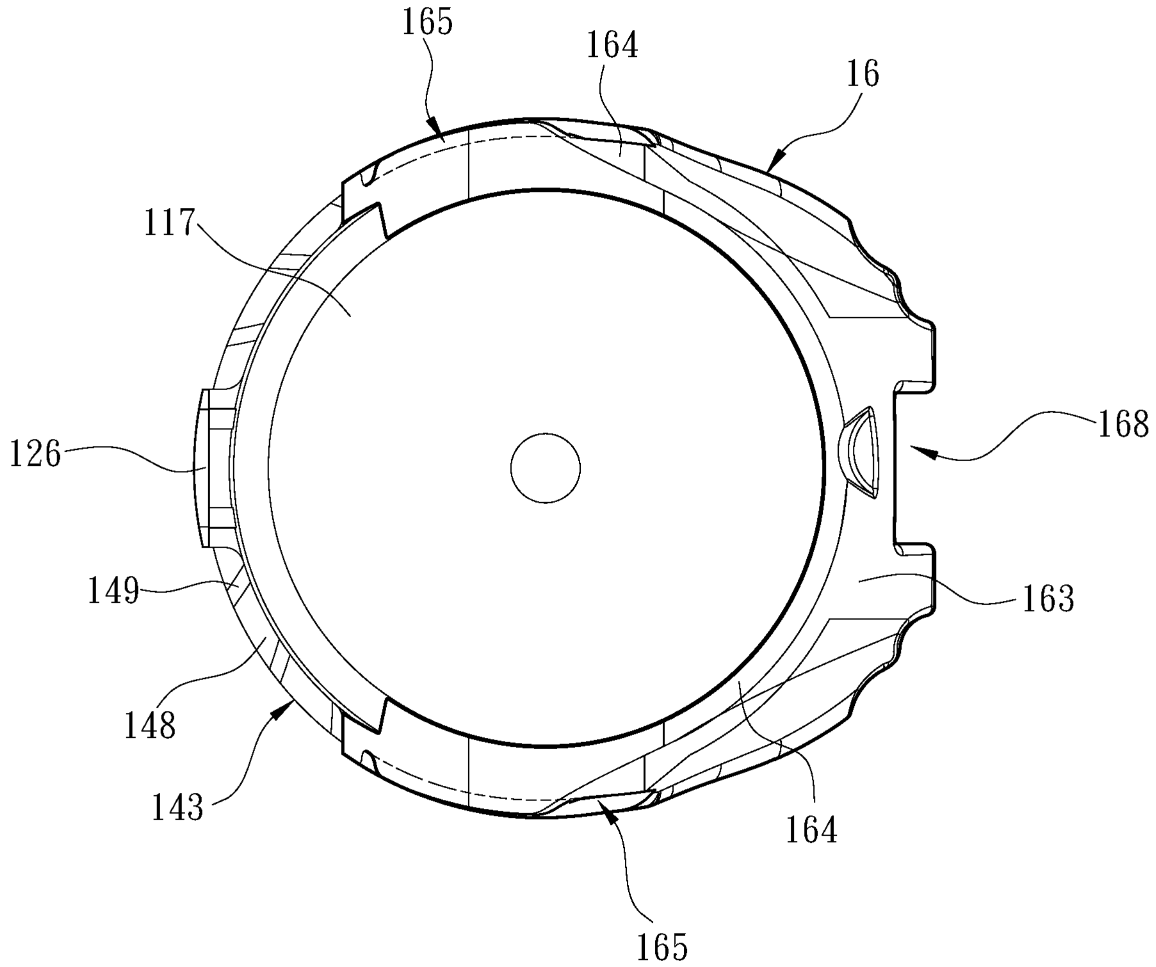
FIG. 4 is a top view of partial components of the first embodiment of the invention.
Figure 5:
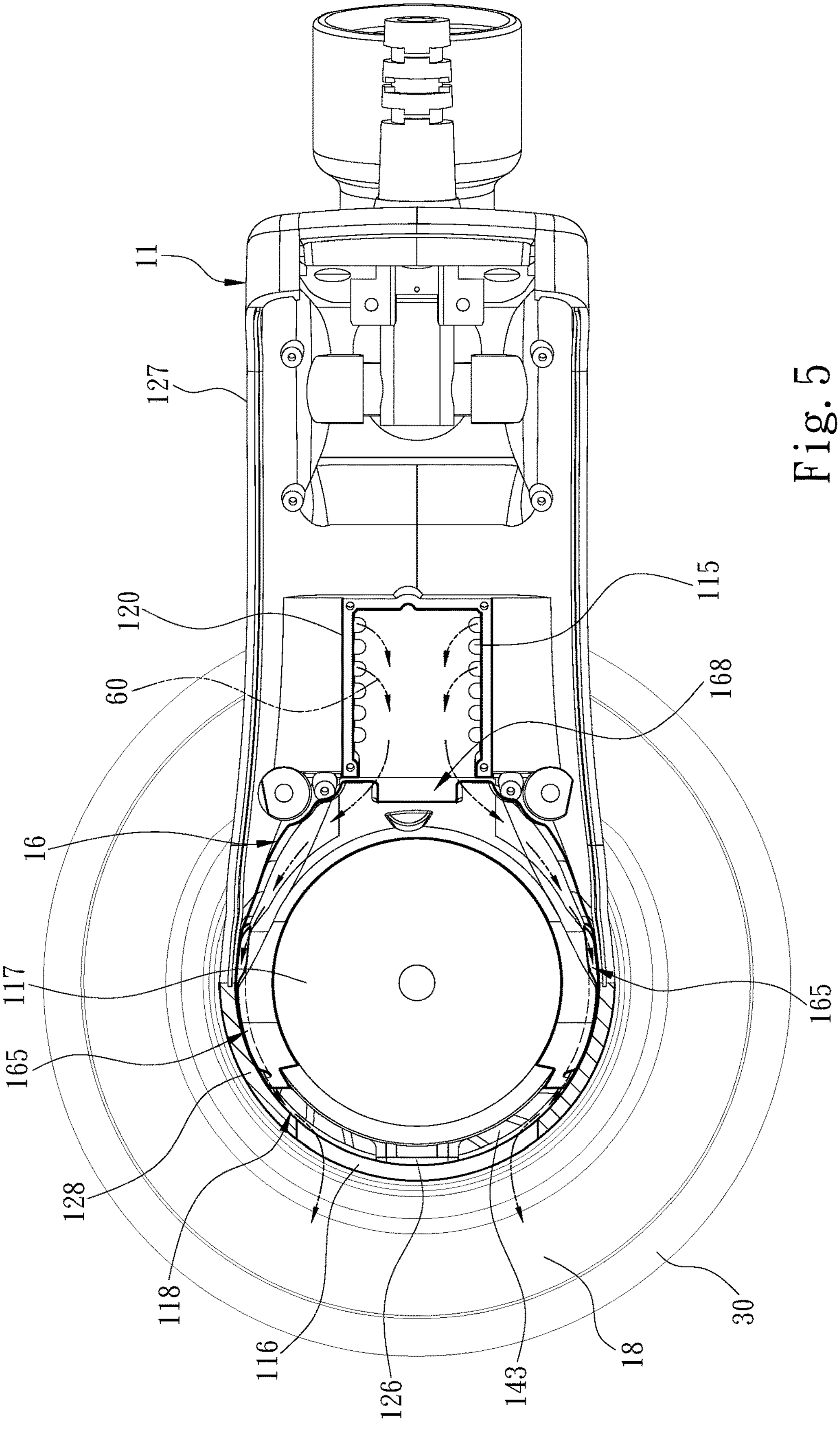
FIG. 5 is a first schematic diagram of airflow of the first embodiment of the invention.
Figure 6:
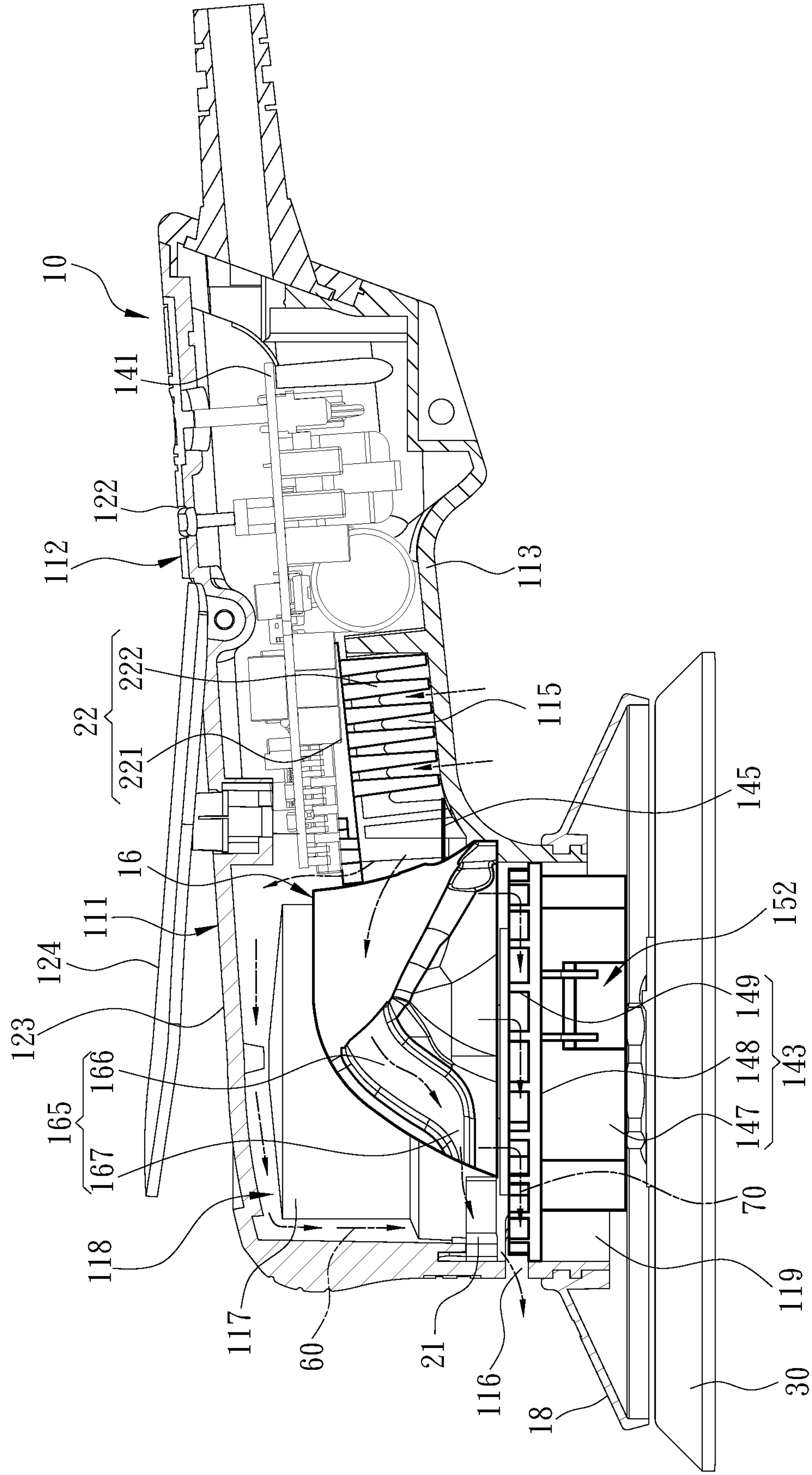
FIG. 6 is a second schematic diagram of airflow of the first embodiment of the invention.
Figure 7:
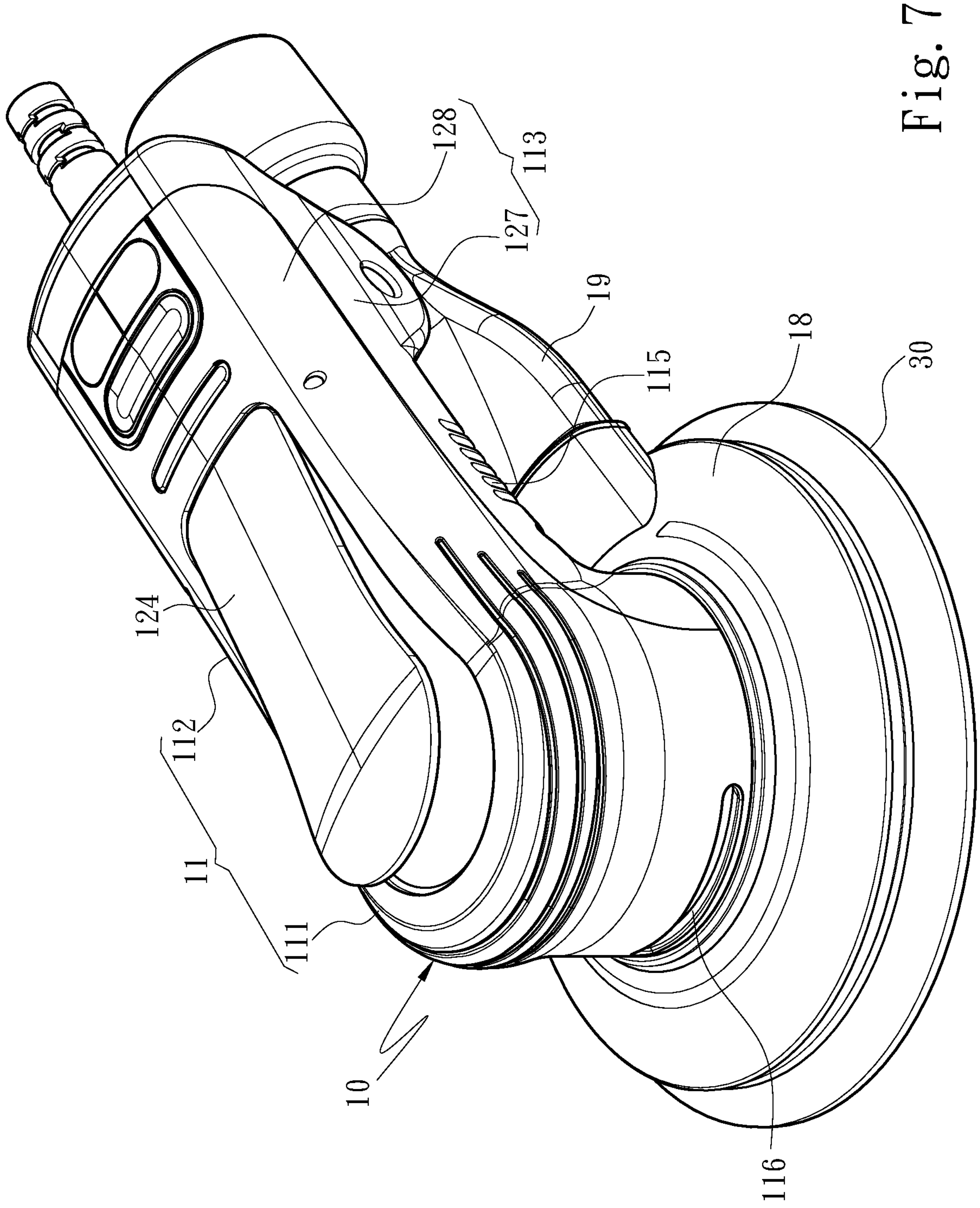
FIG. 7 is a perspective view of a second embodiment of the invention.
Figure 8:
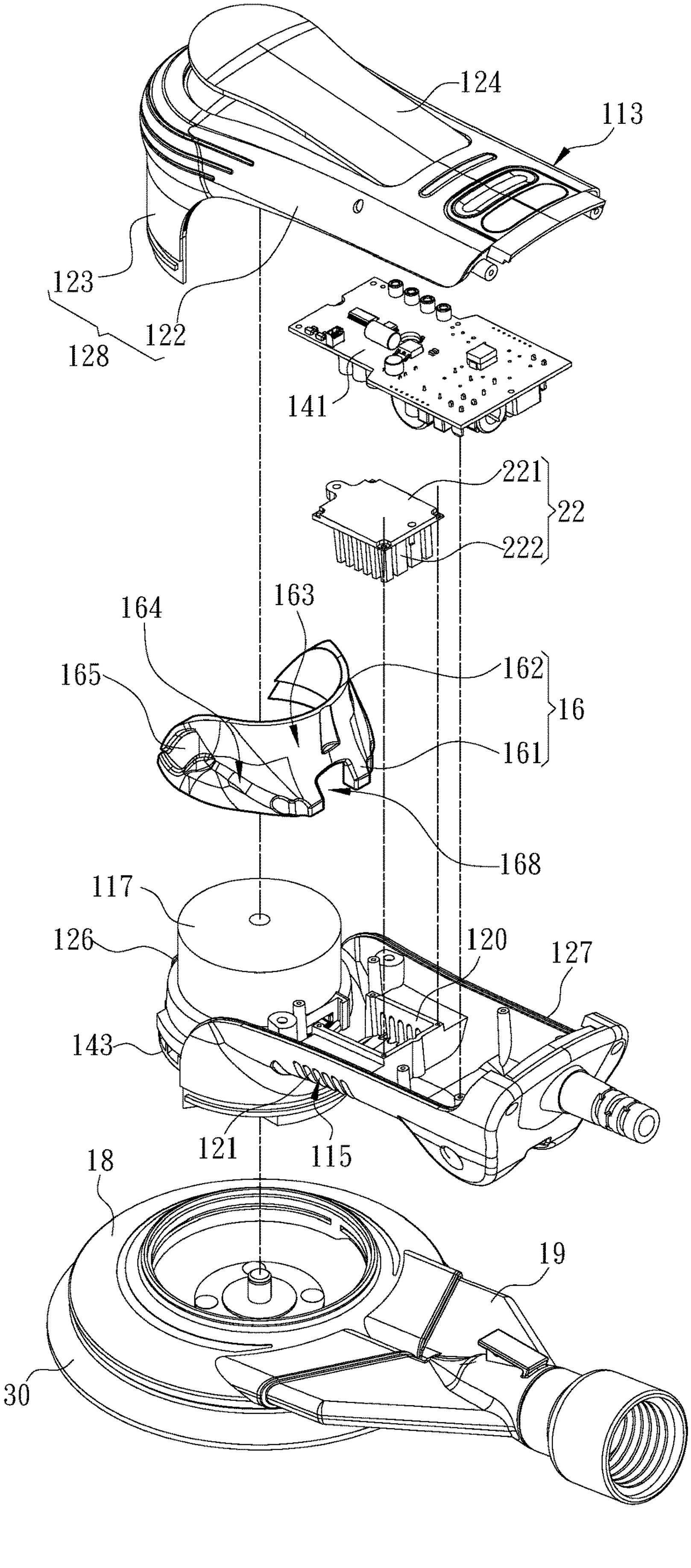
FIG. 8 is an exploded perspective view of the second embodiment of the invention.

The detailed description and technical contents of the present invention are described below with reference to the drawings.

Please refer to FIG. 1, FIG. 2, FIG. 3, FIG. 4, FIG. 5 and FIG. 6. The invention provides a grinding machine tool 10 for reducing hotness of a casing. The grinding machine tool 10 is used in conjunction with a grinding member 30, and the grinding machine tool 10 includes a casing 11 and a drive assembly 14. The casing 11 is divided into a head 111 and a body 112. Specifically, the head 111 of the casing 11 is at a position at which a user's palm holds on when operating the grinding machine tool 10, and the body 112 of the casing 11 is at a position at which the user's wrist or arm abuts against when operating the grinding machine tool 10. The casing 11 is composed of at least two casing parts 113 which are composed of a shape of the grinding machine tool 10, the casing 11 includes an air inlet 115 formed on the body 112 and an air outlet 116 formed on a side of the head 111 opposite to the body 112, and the air inlet 115 and the air outlet 116 are respectively located at positions that will not be shielded by the user when the user operates the grinding machine tool 10. In addition, the casing 11 is provided with a motor cover 117 on the head 111, and the motor cover 117 is open at a side facing the grinding member 30. In more detail, after completion of assembling the at least two casing parts 113, the motor cover 117 does not contact the at least two casing parts 113 to have a gap inbetween, so that an airflow passage 118 communicating with the air inlet 115 and the air outlet 116 is formed between the casing 11 and the motor cover 117.

The drive assembly 14 includes a circuit board 141 provided in the casing 11, a motor 142 electrically connected to the circuit board 141, and an airflow generating member 143 rotating synchronously with the motor 142. Specifically, the motor 142 is placed from an open side of the motor cover 117 and is partially shielded by the motor cover 117. The airflow generating member 143 is located on a side of the motor 142 facing the grinding member 30. After the airflow generating member 143 is assembled, the open side of the motor cover 117 is shielded, so that an end of the motor 142 that is not shielded by the motor cover 117 faces the airflow generating member 143. In addition, the motor 142 is activated after receiving electric power from the circuit board 141, and an output shaft 144 of the motor 142 is rotated to drive the grinding member 30 to perform grinding operations. Furthermore, when the motor 142 operates, the airflow generating member 143 is rotated synchronously, and a first heat dissipation airflow 60 and a second heat dissipation airflow 70 are generated when the airflow generating member 143 rotates.

Specifically, gas pressure changes in the head 111 when the airflow generating member 143 rotates, so that external air enters from the air inlet 115 and transforms into the first heat dissipation airflow 60, and the first heat dissipation airflow 60 enters the casing 11 and flows along the airflow passage 118. Since the motor 142 is shielded by the motor cover 117, the first heat dissipation airflow 60 cannot flow into the motor 142 but flows along the motor cover 117 and an inner wall surface of the head 111, and then the first heat dissipation airflow 60 is guided by the airflow generating member 143 to be discharged from the air outlet 116. The first heat dissipation airflow 60 exchanges heat with the circuit board 141 during a flowing process, and then exchanges heat with the motor cover 117 when flowing through the head 111, so as to take away the thermal energy accumulated on the circuit board 141, and reduce heat of the motor 142 to be transferred to the motor cover 117. On the other hand, when the airflow generating member 143 rotates, a side of the motor 142 facing the airflow generating member 143 changes gas pressure to generate the second heat dissipation airflow 70. The second heat dissipation airflow 70 exchanges heat with the side of the motor 142 facing the airflow generating member 143, and the second heat dissipation airflow 70 is guided by the airflow generating member 143 to be discharged from the air outlet 116 to the outside during the flowing process. Thereby the second heat dissipation airflow 70 is capable of dissipating heat of the side of the motor 142 facing the airflow generating member 143, and the heat of the side of the motor 142 facing the airflow generating member 143 can be discharged outside of the casing 11.

In addition to dissipating heat from the side of the motor 142 facing the airflow generating member 143 by the second heat dissipation airflow 70 in the invention, after the casing 11 is assembled, the invention further utilizes the airflow passage 118 formed by the motor cover 117 without contacting the at least two casing parts 113, so that the first heat dissipation airflow 60 is capable of flowing in the airflow passage 118 to change airflow in the casing 11, thereby reducing a circumstance that thermal energy on a conventional circuit board and a conventional motor transfers thermal radiation to a conventional casing due to poor air circulation inside the conventional grinding machine tool, and also solving the problem of uneven heat dissipation of the conventional grinding machine tool. Furthermore, when the first heat dissipation airflow 60 flows through the airflow passage 118, since the motor 142 is shielded by the motor cover 117, the first heat dissipation airflow 60 cannot flow into the motor 142 but flows along a surface of the motor cover 117 and the inner wall surface of the head 111, thereby the first heat dissipation airflow 60 is capable of exchanging heat with the motor cover 117 and the head 111, and reducing dust in the first heat dissipation airflow 60 to be flew into the motor 142. In addition, when the first heat dissipation airflow 60 of the invention flows through the casing 11, the first heat dissipation airflow 60 not only dissipates heat of the motor 142, but the first heat dissipation airflow 60 can further simultaneously exchange heat with the circuit board 141. The first heat dissipation airflow 60 takes away heat accumulated on the circuit board 141 during the flowing process, reduces heat of the circuit board 141 being transferred to the casing 11, thereby preventing the casing 11 from getting hot.

Please refer to FIG. 2, FIG. 3, FIG. 4, FIG. 5, FIG. 6, FIG. 7 and FIG. 8, in one embodiment, the grinding machine tool 10 includes an air guiding member 16 provided in the casing 11, the air guiding member 16 is located on the airflow passage 118 to receive the first heat dissipation airflow 60 from the body 112, the air guiding member 16 includes a wind receiving end 161 and an air output end 162, the air output end 162 is higher than the wind receiving end 161, the air output end 162 and the wind receiving end 161 guide the first heat dissipation airflow 60 to flow along a surface of the air guiding member 16. Specifically, the air guiding member 16 is disposed on a side of the motor cover 117 facing the body 112 and located at a junction of the body 112 and the head 111, the motor cover 117 is cylindrical, the air guiding member 16 is located at an edge of the motor cover 117 and is provided at least along a half circumference of the motor cover 117. The air guiding member 16 forms a main guide surface 163 and two auxiliary guide surfaces 164, the two auxiliary guide surfaces 164 are respectively provided at two sides of the main guide surface 163, and respectively extending from the main guide surface 163 toward a gap between a side of the motor cover 117 and an inner wall of the head 111, and airflow guiding directions of the two auxiliary guide surfaces 164 is different from an airflow guiding direction of the main guide surface 163. Specifically, a portion of the first heat dissipation airflow 60 guided by the main guide surface 163 flows toward a part of the airflow passage 118 located between a top of the motor cover 117 and the at least two casing parts 113, so that a portion of the first heat dissipation airflow 60 exchanges heat with a part of the head 111 where the user's palm is contacted. the two auxiliary guide surfaces 164 respectively guides a portion of the first heat dissipation airflow 60 flows into a part of the airflow passage 118 located between the side of the motor cover 117 and the at least two casing parts 113, so that the portion of the first heat dissipation airflow 60 exchanges heat with the part of the head 111 for the user's fingers to grasp.

Two sides of the air guiding member 16 respectively extend along two sides of the motor cover 117 and contact the inner wall surface of the head 111 to form a guide passage 165. Practically, the guide passage 165 is implemented by a groove-like structure on the air guiding member 16, and the inner wall surface of the head 111 seals off one side of the groove-like structure, so that the head 111 and the air guiding member 16 together define the guide passage 165, and the guide passage 165 guides the portion of the first heat dissipation airflow 60 in the airflow passage 118. An inlet 166 of the guide passage 165 is connected to the main guide surface 163 and receives the portion of the first heat dissipation airflow 60 from the main guide surface 163, and an outlet 167 of the guide passage 165 is lower than the inlet 166 of the guide passage 165 to guide the portion of the first heat dissipation airflow 60 to flow toward the air outlet 116. Moreover, in this embodiment, the guide passage 165 is formed by the air guiding member 16 and an upper casing 128. In other embodiments, the guide passage 165 can be formed by the air guiding member 16. In addition, in one embodiment, the air guiding member 16 is formed with a wire opening 168 located on the main guide surface 163, and the wire opening 168 is provided for a power line 145 connecting with the motor 142 and the circuit board 141 to pass through.

On the other hand, please refer to FIG. 2, FIG. 3, FIG. 4, FIG. 5 and FIG. 6. In one embodiment, the motor 142 further includes a main body 140 assembled with the output shaft 144, and a base 146 assembled with the grinding member 30 and driven by the output shaft 144. The main body 140 is a stator-rotor called by those having ordinary skill in the art, the main body 140 is electrically connected to the circuit board 141 to drive the output shaft 144 rotating, the base 146 is connected to a side of the output shaft 144 without facing the main body 140 and assembled with the airflow generating member 143, and the base 146 is driven by the output shaft 144 to rotate the airflow generating member 143 and the grinding member 30 when the motor 142 is activated. In one embodiment, after completion of assembling the airflow generating member 143 with the base 146, the airflow generating member 143 laterally faces the air outlet 116, and the airflow generating member 143 guides the first heat dissipation airflow 60 and the second heat dissipation airflow 70 to flow toward the air outlet 116 after rotating. Specifically, the airflow generating member 143 includes a mounting seat 147 assembled with the base 146, an end plate 148 extending from the mounting seat 147, and a plurality of fan blades 149 provided on the end plate 148. The end plate 148 is disposed on a side of the mounting seat 147 facing the motor 142, and the plurality of fan blades 149 are disposed on a side of the end plate 148 facing the motor 142. In one embodiment, where the plurality of fan blades 149 facing the side of the end plate 148 are assembled with the end plate 148, and where the plurality of fan blades 149 without facing the end plate 148 extend in a direction opposite to the end plate 148, so that the plurality of fan blades 149 are disposed on the end plate 148 in a standing manner. The plurality of fan blades 149 laterally face the air outlet 116 during the rotation process of the airflow generating member 143, and the plurality of fan blades 149 drive the first heat dissipation airflow 60 and the second heat dissipation airflow 70 after the airflow generating member 143 rotating, so that the first heat dissipation airflow 60 and the second heat dissipation airflow 70 flow toward an outer periphery of the end plate 148 and are discharged from the air outlet 116. In another embodiment, the mounting seat 147 includes an accommodating space 150 for disposal of the base 146, the base 146 includes two blocks 151 provided in staggered positions, and a shape of the accommodating space 150 matches the two blocks 151. In one embodiment, in order to assemble the base 146 with the airflow generating member 143 stably, the mounting seat 147 is provided with at least two restraining arms 152 to restrict one of the two blocks 151. In addition, the accommodating space 150 penetrates through two ends of the mounting seat 147, that is, the two ends of the mounting seat 147 are open to prevent the base 146 from detaching from the airflow generating member 143, the mounting seat 147 is provided with a limiting wall 153 at a side of the accommodating space 150 opposite to the end plate 148, and the limiting wall 153 and the at least two restraining arms 152 jointly restrain one of the two blocks 151.

Figure 9:
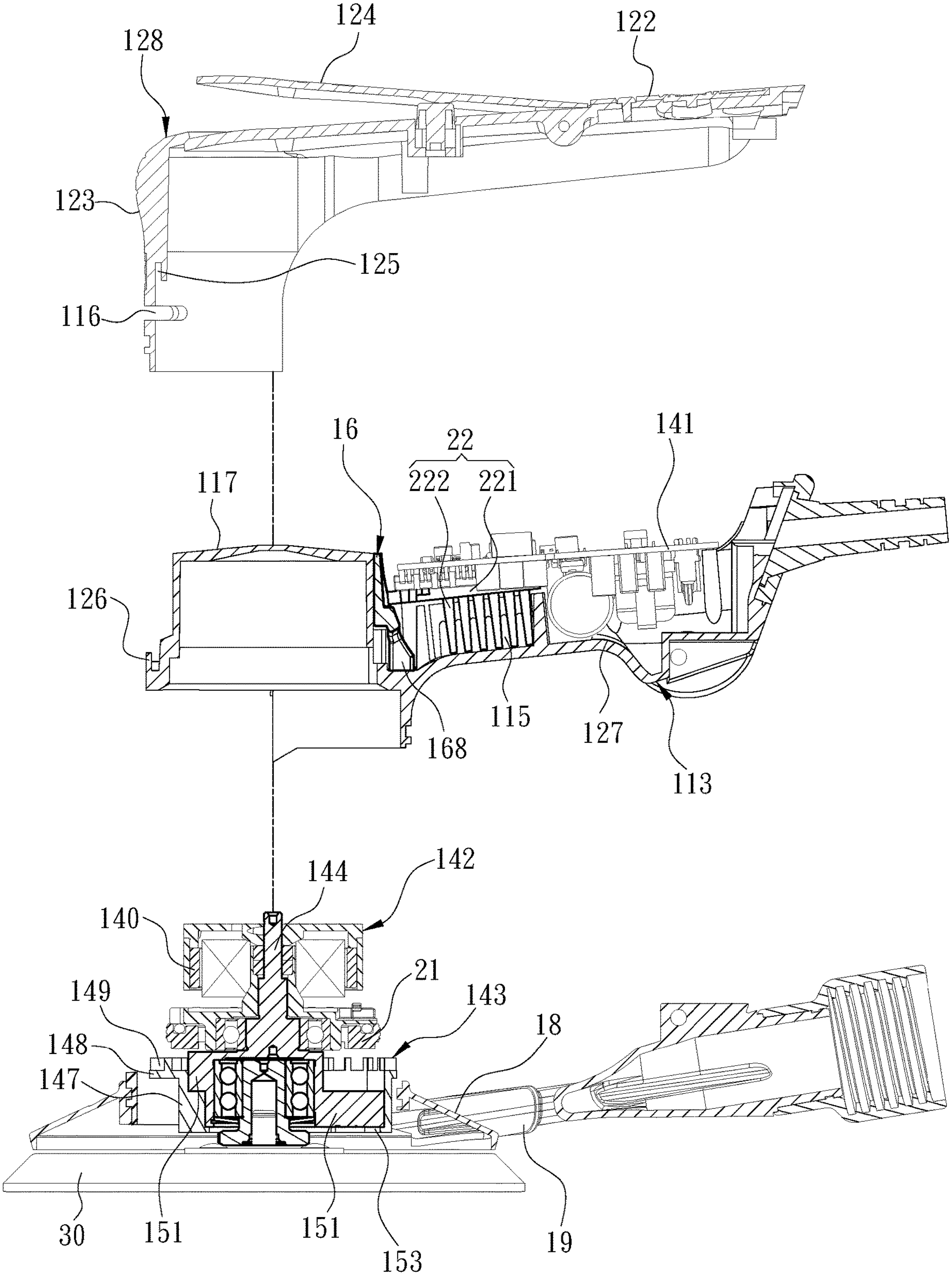
FIG. 9 is a first schematic diagram of airflow of the second embodiment of the invention.
Figure 10:
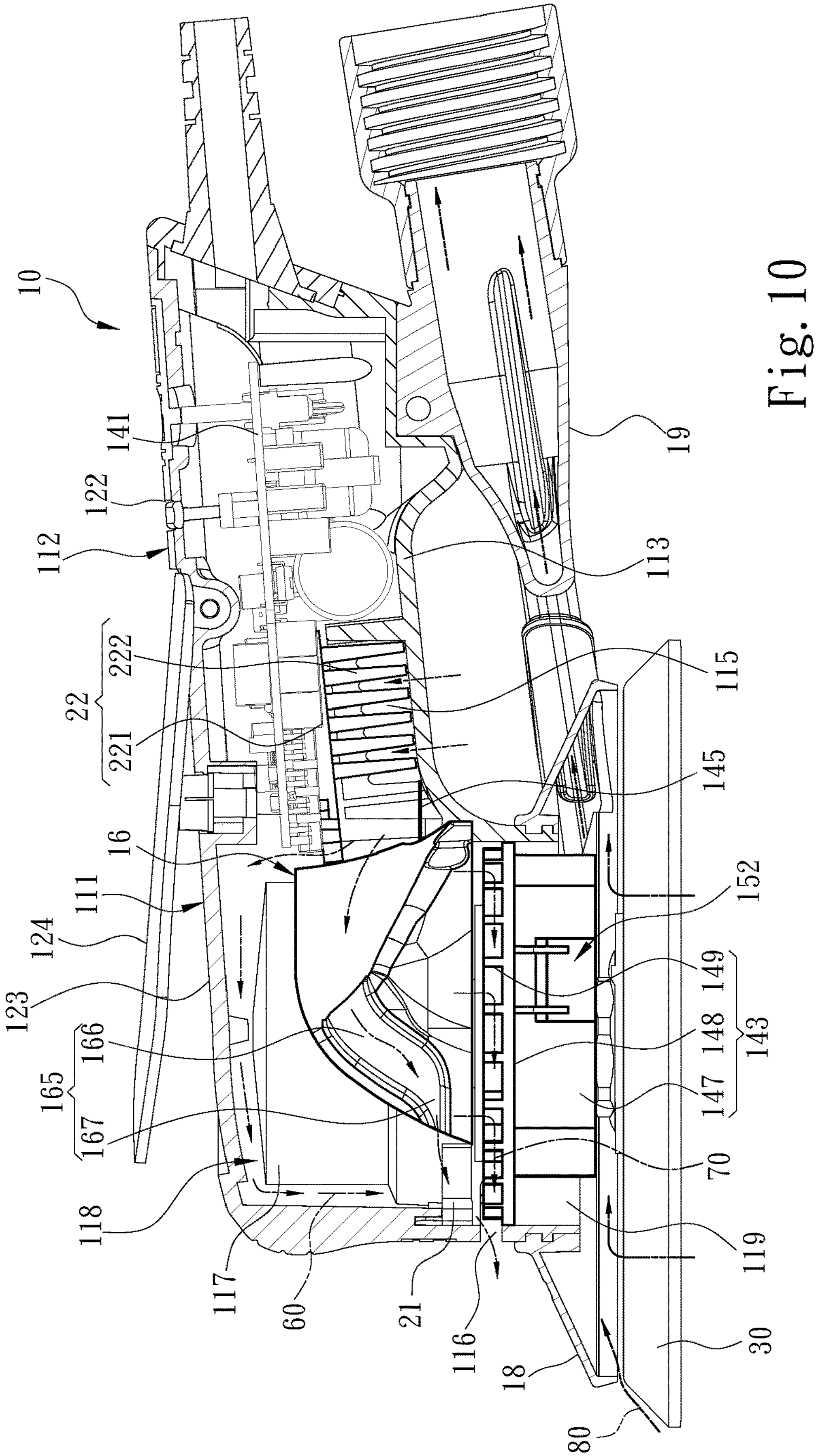
FIG. 10 is a second schematic diagram of airflow of the second embodiment of the invention.

In the foregoing embodiment, the grinding machine tool 10 does not have a dust collecting structure. In order to reduce an amount of dust scattering around during grinding, the grinding machine tool 10 can be additionally equipped with a dust collecting device during grinding. Please refer to FIG. 8, FIG. 9 and FIG. 10, in another embodiment, the grinding machine tool 10 includes a dust collection function. Specifically, the grinding machine tool 10 does not blow the dust by using the first heat dissipation airflow 60 and the second heat dissipation airflow 70 during grinding, but uses an additional airflow path to suck the dust. Further, the casing 11 of the invention includes an assembly opening 119 provided on the head 111, the assembly opening 119 is provided for the airflow generating member 143 to be disposed therein, and a size of the assembly opening 119 is consistent with a size of the end plate 148. In other words, the head 111 of the grinding machine tool 10 of the invention is divided into an upper part and a lower part by the end plate 148, and a side of the end plate 148 opposite to the grinding member 30 in the head 111 is used to accommodate the motor 142, so that the first heat dissipation airflow 60 and the second heat dissipation airflow 70 are capable of flowing therein. A side of the end plate 148 facing the grinding member 30 is provided for a dust suction airflow 80 to flow therein, instead of the first heat dissipation airflow 60 and the second heat dissipation airflow 70. To further explain, the grinding machine tool 10 includes a dust cover 18 located on the head 111 and a dust collecting tube 19 provided on the dust cover 18, and the dust cover 18 is located on a side of the casing 11 facing the grinding member 30 to be assembled with the assembly opening 119. The dust cover 18 faces the grinding member 30 after being assembled, and the dust collecting tube 19 communicates with the assembly opening 119 through the dust cover 18 to form an airflow path. The grinding member 30 generates the dust during grinding, the dust is blocked by the end plate 148 and moves in the assembly opening 119, and the dust cover 18 prevents the dust from rapidly spreading to the outside. The high-pressure dust suction airflow 80 is generated after the dust collecting tube 19 is activated, the dust suction airflow 80 flows in the airflow path and drives the dust, so that the dust flows into the dust collecting tube 19 along the airflow path and a chance of flowing toward the airflow passage 118 is reduced.

On the other hand, please refer to FIG. 6, FIG. 7, FIG. 8, FIG. 9 and FIG. 10. In one embodiment, the grinding machine tool 10 includes an end cover 21 provided at the open side of the motor cover 117, and the end cover 21 is assembled to the side of the motor cover 117 facing the airflow generating member 143. The end cover 21 and the motor cover 117 jointly shield the motor 142 and enable the motor 142 work stably after completion of assembling the end cover 21.

On the other hand, please refer to FIG. 6, FIG. 7, FIG. 8, FIG. 9 and FIG. 10. In one embodiment, the circuit board 141 is disposed on the body 112, and the grinding machine tool 10 includes a heat sink 22 disposed on the body 112. The heat sink 22 is used to dissipate heat from the circuit board 141. The at least two casing parts 113 are formed with a positioning groove 120 for disposing of the heat sink 22, the air inlet 115 is located in the positioning groove 120, and the heat sink 22 is disposed of facing the air inlet 115. Further, the air inlet 115 is composed of a plurality of strip holes 121, the heat sink 22 includes a baseplate 221 provided on the circuit board 141 and a plurality of heat dissipation fins 222 provided on the baseplate 221, and the plurality of heat dissipation fins 222 do not interfere with the air inlet 115. Specifically, the plurality of heat dissipation fins 222 are provided at intervals, and the plurality of heat dissipation fins 222 are not disposed in an air inlet path of the strip holes 121. Thereby, the plurality of heat dissipation fins 222 do not affect air intake of the plurality of strip holes 121.

Furthermore, in one embodiment, the at least two casing parts 113 are divided into a lower casing 127 and an upper casing 128. The lower casing 127 is assembled with the motor cover 117, the upper casing 128 and the lower casing 127 jointly define the airflow passage 118 without contacting to the motor cover 117. In one embodiment, the lower casing 127 is formed with the air inlet 115 for the first heat dissipation airflow 60 entering into the casing 11 so that the first heat dissipation airflow 60 is able to flow between the upper casing 128 and the lower casing 127. In another embodiment, the motor cover 117 can be formed with one of the at least two casing parts 113 which is divided into the lower casing 127. Further, the upper casing 128 includes an assembling portion 122 which is assembled with the lower casing 127 to form the body 112, and an extending portion 123 extending from the assembling portion 122 to form the head 111 with the lower casing 127. The assembling portion 122 is assembled with an operable operating press plate 124 thereon, the extending portion 123 is covered above the motor cover 117, the airflow passage 118 is formed between the motor cover 117 and the upper casing 128. In one embodiment, the extending portion 123 is formed with an assembling hole 125, the motor cover 117 is formed with an assembling structure 126 that matches the assembling hole 125, and the assembling structure 126 is assembled in the assembling hole 125 to assist the motor cover 117 to be stably disposed in the head 111.

What is claimed is:

1. A grinding machine tool for reducing hotness of a casing, comprising:

the casing, divided into a head and a body, the casing being composed of at least two casing parts, the casing comprising an air inlet formed on the body and an air outlet formed on a side of the head opposite to the body;

a motor cover, provided in and surrounded by the head of the casing, one end of the motor cover facing a grinding member being open, and the motor cover being cylindrical, wherein a gap is between the motor cover and the at least two casing parts, and the gap comprises a first portion located between a top of the motor cover and the casing, and two second portions respectively located between two sides of the motor cover and an inner wall of the head;

a drive assembly, arranged in the casing, comprising a circuit board, a motor placed into the motor cover and connected to the circuit board to drive the grinding member to rotate, and an airflow generating member shielding a side of the motor cover facing the grinding member and located between the motor and the grinding member, and the airflow generating member rotating synchronously with the motor; and an air guiding member, provided in the casing and located in the gap, and the air guiding member comprising a wind receiving end and an air output end higher than the wind receiving end, wherein the air guiding member comprises a main guide surface and two auxiliary guide surfaces, the main guide surface faces the first portion of the gap, and the two auxiliary guide surfaces are respectively disposed at two sides of the main guide surface and face one of the second portions of the gap, and airflow guiding directions of the two auxiliary guide surfaces are different from an airflow guiding direction of the main guide surface;

wherein when the airflow generating member rotates inside the casing, external air enters from the air inlet and is divided into a first heat dissipation airflow and a second heat dissipation airflow having different flow paths in the casing;

wherein a flow path of the first heat dissipation airflow begins at the air inlet, passes by the circuit board, flows through the gap between the head of the casing and an upper surface of the motor cover, and exits through the air outlet, thereby dissipating heat from the circuit board and the head of the casing; and wherein a flow path of the second heat dissipation airflow begins at the air inlet, flows directly into a space between a lower surface of the motor and the airflow generating member, and exits through the air outlet, thereby dissipating heat on a side of the motor facing the airflow generating member.

2. The grinding machine tool for reducing hotness of the casing as claimed in claim 1, wherein two sides of the air guiding member respectively extend on an edge of the motor cover and form a guide passage in a groove between the motor cover and an inner wall of the head, and an inlet of the guide passage is located above an outlet of the guide passage.

3. The grinding machine tool for reducing hotness of the casing as claimed in claim 1, wherein the air guiding member is located at a junction of the body and the head.

4. The grinding machine tool for reducing hotness of the casing as claimed in claim 1, wherein the motor comprises an output shaft and a base assembled with the grinding member and driven by the output shaft, the airflow generating member comprises a mounting seat assembled with the base, an end plate extending from the mounting seat, and a plurality of fan blades provided on a side of the end plate facing the motor cover.

5. The grinding machine tool for reducing hotness of the casing as claimed in claim 4, wherein the plurality of fan blades stand on the end plate.

6. The grinding machine tool for reducing hotness of the casing as claimed in claim 4, wherein the base comprises two blocks provided in staggered positions, and the mounting seat comprises an accommodating space formed to match the two blocks.

7. The grinding machine tool for reducing hotness of the casing as claimed in claim 6, wherein the mounting seat is provided with at least two restraining arms for restraining the base from detaching.

8. The grinding machine tool for reducing hotness of the casing as claimed in claim 7, wherein the accommodating space penetrates through two ends of the mounting seat, the mounting seat is provided with a limiting wall at an end of the accommodating space away from the plurality of fan blades, and the limiting wall and the at least two restraining arms jointly restrain the base.

9. The grinding machine tool for reducing hotness of the casing as claimed in claim 1, further comprising an end cover provided at the one end of the motor cover which is open.

10. The grinding machine tool for reducing hotness of the casing as claimed in claim 1, wherein the at least two casing parts are divided into a lower casing and an upper casing, the lower casing is assembled with the motor cover, and the upper casing does not contact the motor cover and jointly forms the gap with the lower casing.

11. The grinding machine tool for reducing hotness of the casing as claimed in claim 1, further comprising a dust cover assembled with the casing and located on the head, and a dust collecting tube provided on the dust cover.

12. The grinding machine tool for reducing hotness of the casing as claimed in claim 1, wherein the circuit board is provided on the body, the grinding machine tool comprises a heat sink provided on the body and capable of dissipating heat from the circuit board, the at least two casing parts are formed with a positioning groove for placing the heat sink therein, and the air inlet is formed in the positioning groove.

13. The grinding machine tool for reducing hotness of the casing as claimed in claim 12, wherein the air inlet is composed of a plurality of strip holes.

* * * * *